US012078483B2

(12) United States Patent
Hammerer et al.

(10) Patent No.: US 12,078,483 B2
(45) Date of Patent: Sep. 3, 2024

(54) LASER-BASED LEVELLING SYSTEM

(71) Applicant: LEICA GEOSYSTEMS AG, Heerbrugg (CH)

(72) Inventors: Markus Hammerer, Fraxern (AT); Elvir Malkoč, Widnau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 442 days.

(21) Appl. No.: 17/558,055

(22) Filed: Dec. 21, 2021

(65) Prior Publication Data

US 2022/0196403 A1   Jun. 23, 2022

(30) Foreign Application Priority Data

Dec. 21, 2020  (EP) .................................... 20216166

(51) Int. Cl.
| | |
|---|---|
| *G01B 11/27* | (2006.01) |
| *G01C 15/00* | (2006.01) |
| *H04B 1/7163* | (2011.01) |
| *H04W 4/80* | (2018.01) |
| *H04W 76/10* | (2018.01) |

(52) U.S. Cl.
CPC .......... *G01C 15/006* (2013.01); *G01B 11/272* (2013.01); *H04B 1/7163* (2013.01); *H04W 4/80* (2018.02); *H04W 76/10* (2018.02)

(58) Field of Classification Search
CPC .............................. G01C 15/006; G01B 11/272
USPC ............................ 33/281, 282, 285, 286, 533
See application file for complete search history.

(56) References Cited

U.S. PATENT DOCUMENTS

| | | | |
|---|---|---|---|
| 4,830,489 A | 5/1989 | Cain et al. | |
| 6,327,090 B1 | 12/2001 | Rando et al. | |
| 6,606,798 B2 * | 8/2003 | El-Katcha | G01C 15/06 33/290 |
| 7,323,673 B1 * | 1/2008 | Ake | G01J 1/4257 250/214 R |

(Continued)

FOREIGN PATENT DOCUMENTS

| | | |
|---|---|---|
| CN | 204963863 U | 1/2016 |
| DE | 10 2010 043359 A1 | 5/2012 |

(Continued)

OTHER PUBLICATIONS

EP Search Report in Application No. 20 21 6166 dated Jun. 11, 2021.

*Primary Examiner* — George B Bennett
(74) *Attorney, Agent, or Firm* — Maschoff Brennan (57) ABSTRACT

A method comprises detecting at a plurality of light-receiver units, an impingement position of the light plane on a photo sensor that has a known relative position in relation to the surface, determining, for each light-receiver unit and based on the impingement position and the known relative position, a crossing position value of the light plane with respect to the surface, performing a combined analysis of the crossing position values from the plurality of light-receiver units to derive alignment information comprising the deviation of the alignment of the surface of the structure relative to the light plane, and displaying the alignment information to a user. The invention also relates to computer programme product, a light-receiver unit and a system comprising a plurality of light-receiver units for performing the method.

20 Claims, 7 Drawing Sheets

(56) References Cited

U.S. PATENT DOCUMENTS

| | | | | |
|---|---|---|---|---|
| 9,146,106 B2 * | 9/2015 | Bank | ................... | G01C 15/002 |
| 9,207,078 B2 * | 12/2015 | Schorr | ................ | G01C 15/008 |
| 9,605,951 B2 * | 3/2017 | Hölzl | .................... | G01B 11/14 |
| 10,670,398 B2 * | 6/2020 | Essling | ................ | G01J 1/4228 |
| 11,092,438 B2 * | 8/2021 | Seitz | ....................... | G01C 3/08 |
| 11,456,572 B2 * | 9/2022 | Mori | ...................... | G01B 11/27 |
| 11,953,322 B2 * | 4/2024 | Sojic | ................... | G01C 15/004 |
| 2005/0068626 A1 | 3/2005 | Dang et al. | | |
| 2007/0271800 A1 | 11/2007 | Hersey et al. | | |
| 2018/0335316 A1 | 11/2018 | Lukic | | |
| 2023/0137777 A1 * | 5/2023 | Nakamura | ............. | G06F 9/453 |
| | | | | 33/228 |

FOREIGN PATENT DOCUMENTS

| | | |
|---|---|---|
| EP | 1 192 484 A | 4/2002 |
| EP | 1 519 147 A | 3/2005 |
| EP | 2 930 465 A | 10/2015 |
| EP | 3 425 334 A | 1/2019 |
| WO | 03/058322 A1 | 7/2003 |
| WO | 2013/135891 A1 | 9/2013 |
| WO | 2017/066836 A1 | 4/2017 |

\* cited by examiner

LASER-BASED LEVELLING SYSTEM

BACKGROUND

The present invention generally relates to an electronic laser-based system for determining and indicating whether or not a surface of a structure is aligned with respect to a given plane and for determining and indicating the deviation. In particular, the system can be used to determine and indicate whether the surface is horizontal (level) or vertical (plumb) and also by how much it deviates from the given plane.

Alignment of surfaces is a constant problem in a variety of fields, ranging from construction to interior decorating. Alignment and marking of height references are necessary for walls that should be perpendicular to a floor, or otherwise plumb. Carpenters and cabinetmakers are well aware of the importance of plumbed and aligned surfaces, for instance when installing built-in furniture such as closets, cupboards, shelves, kitchen countertops or stairs.

Traditionally, these tasks are performed using spirit levels. More recently also laser levelling devices are in use that comprise a rotating laser beam projector that can be affixed to a tripod. The beam projector is levelled according to the accuracy of the device and projects a fixed red or green beam in a plane, for instance about the horizontal or vertical axis. Laser levelling devices are often used at construction sites, and commonly use laser diodes with wave lengths of green or red for projecting visible points, or horizontal and vertical lines on walls, floor or ceiling. The level may aligned manually ("levelled") by directing the projection line towards a target point, so that corresponding projections in defined angles relative to the target point (in particular 90° and 180°) can be provided. Laser levels are mainly used for installation of interior decoration, doors, windows, pipelines, tunnels, or for inspections and engineering supervision.

In the technical field of laser leveling, a laser rotator or a line laser is used to span a leveling plane which can be horizontal, vertical or tilted by a desired angle. The laser plane is often detected by a laser receiver, which detects the striking position of the laser inside a detection window to determine the receiver's position relative to the laser plane. The detection window, or receiver window, is the area at the laser receiver device, which is embodied to detect the light beam, in particular the position of the light beam's striking point within the detection window for determining the relative position of the laser-beam's axis and the receiver device in at least one direction. In many embodiments, the receiver indicates a deviation from an ideal position by indicative or quantifying means. For example, in interior fittings, like installing furniture such a kitchen or internal drywalls or the like, many structures have to be aligned horizontally, vertically, parallel or perpendicular with respect to one another. Where previously spirit level, carpenter's square, chalk line, measuring tape and folding rule were used, nowadays often line lasers are used such, as e.g. described in EP 2 930 465, EP 3 425 334, EP 1 192 484, US 2007/271 800, WO 03/058 322, EP 1 519 147, U.S. Pat. No. 6,327,090 or CN 204963863 U.

However, especially in indoor applications with confined space, the setup of a rotating laser beam projector may be too time-consuming and complicated for the task of aligning one or more surfaces. EP 3 425 334 A1 discloses a laser level that is configured to provide laser fan beams to project a horizontal reference line and a vertical reference line, and to provide spot beams to project reference points in four spatial directions.

Also a variety of different levelling receivers are known in the art.

For example, U.S. Pat. No. 4,830,489 describes a BiCell based levelling laser receiver for linearly determining a relative height of a rotating laser beam from a laser rotator. It determines the azimuth position of the receiver at the rotator, by means of a back reflected signal by the receiver. For a distance measurement of the rotator to the receiver, time of flight as well as phase shift measurement methods of the back reflected signal are proposed. Radio transmission is then used to communicate the azimuth position as well as the distance to the receiver.

In WO 2013/135 891, the laser receiver can be provided with communication means, which are preferably designed for remote wireless communication, which is connected to the circuitry, so that the derived information about movement of the laser receiver, movement of the laser receiver with respect to the laser light plane, or off- and on-grade of the laser receiver with the laser beam can be transmitted to further units like the laser emitter emitting the detected laser beam and or an external data analyzing or control unit used by an operating person in order to control the laser emitter or a construction machine.

Light receiver units known in the art are however designed to be either handheld or mounted to tripods, poles or handles, which is impractical for applications where surfaces are to be aligned.

SUMMARY

It is therefore an object of the present disclosure to provide an improved system and an improved light receiver unit that can be easily used in surface alignment applications, particularly in applications in which a deviation of an alignment of a surface with respect to a given plane is determined.

It is another object to provide an improved system for determining a deviation of an alignment of a surface with respect to a given plane.

It is a particular object to provide such a system that provides fast and reliable results.

It is a particular object to provide such a system that is easy to use for unskilled personnel and can be set-up without difficulty even in small rooms.

It is another object to provide a light receiver unit that can be used in such a system, the given plane being an emitted light plane.

A first aspect relates to a system for deriving alignment information of a surface of a structure, the alignment information comprising a deviation of an alignment of the surface with respect to a light plane. The system comprises a plurality of light-receiver units, each of which comprising an elongate photo sensor configured to be illuminated by the light plane and to detect an impingement position of the light plane, particularly relative to a zero position of the photo sensor, and to provide an electrical output signal indicating said impingement position. According to this aspect, the system comprises an evaluation device configured to be in wireless communication with at least one of the light-receiver units, and each of the light-receiver units comprises at least one alignment surface configured to be placed at the surface of the structure to align the light-receiver device to the surface of the structure, and a first wireless communication interface configured to establish a wireless communication with the evaluation device and/or with the first wireless communication interface of at least one other light-receiver device of the system.

A crossing position value of the light plane can be determined based on the impingement position for each light-receiver unit. The evaluation device comprises a second wireless communication interface configured to establish a wireless communication with the first communication interfaces of at least a subset of the plurality of light-receiver units and to receive data indicating or providing the crossing position values of each of the light-receiver units, an evaluation unit that is configured to perform a combined analysis of the crossing position values from the plurality of light-receiver units and to derive, based thereon, alignment information comprising the deviation of the alignment of the surface of the structure relative to the light plane, and a display unit, wherein the evaluation device is configured to the provide alignment information on the display unit to a user of the system.

According to one embodiment of the system, each of the light-receiver units is formed substantially cubical or cuboidal and comprises a multitude of alignment surfaces, each configured to be placed at the surface of the structure to align the light-receiver device to the surface. In particular each of the light-receiver units comprises at least three, or more particularly at least five, alignment surfaces, the alignment surfaces are formed to be positioned on a basically flat surface, each alignment surface is basically rectangular, and/or each alignment surface has a width and a length of at least 2 cm each, particularly at least 3 cm.

In some embodiments, the crossing position value relates to a crossing position of the light plane with respect to the alignment surface, for instance wherein the crossing position value includes a distance value, for each of the light-receiver units a position of the alignment surface relative to the photo sensor is known, e.g. at least a distance to its zero position, and the system comprises at least one computation unit that is configured to calculate the crossing position value based on the impingement position and the relative position of the alignment surface.

In one embodiment, the evaluation device comprises the computation unit, and the received data provides the impingement position and the relative position of the alignment surface for each of the light-receiver units.

In another embodiment, each of the light-receiver units comprises a computation unit configured to calculate the crossing position of the respective light-receiver unit, wherein data providing the crossing positions is transmitted to the evaluation device.

In a further embodiment, a first light-receiver unit of the light-receiver units comprises the computation unit, wherein data providing the impingement position and the relative position of the alignment surface is transmitted from the other light-receiver units to the first light-receiver unit, and data providing the crossing positions is transmitted from the first light-receiver unit to the evaluation device.

According to another embodiment, each of the light-receiver units comprises a plurality of alignment surfaces and at least one of an orientation sensor that is configured to provide an electrical output signal indicating an orientation of the respective light-receiver unit, and a proximity sensor at one or more of the alignment surfaces, configured to provide an electrical output signal indicating whether the respective alignment surface is placed at a surface, particularly at the surface of the structure.

For instance, said orientation sensor comprises at least one of an accelerometer, a level sensor and a compass, and said proximity sensor comprises at least one of a capacitive sensor, a magnetic sensor and an optical sensor.

According to this embodiment, the computation unit is configured to determine, based on the output signal of the orientation sensor or the proximity sensor, which alignment surface of the plurality of alignment surfaces is placed at the surface of the structure, and/or to calculate the crossing position value based on the output signal of the orientation sensor or the proximity sensor.

In particular, at least one of the alignment surfaces comprises a magnet, a tripod socket or a receptacle to receive a magnet and/or a tripod socket.

According to another embodiment, the light plane is a continuously emitted laser fan and the photo sensor is configured to detect an impingement position of the continuously emitted laser fan.

According to another embodiment, each of the light-receiver units comprises at least two alignment surfaces, wherein the photo sensor and the alignment surfaces are positioned on the respective light-receiver unit in such a way that for each alignment surface a distance to the photo sensor, e.g. a distance to its zero position, is the same.

According to another embodiment, the system comprises at least three light-receiver units, and the evaluation unit is configured to perform a combined analysis of the crossing position values from the at least three light-receiver units and to derive, based on the analysis, alignment information comprising the deviation of the alignment of the surface of the structure relative to the light plane in two or three dimensions, particularly with at least four degrees of freedom.

According to another embodiment, the system comprises at least three light-receiver units, and the first wireless communication interfaces are configured to establish the wireless communication via Bluetooth and to establish a scatternet communication network, in particular configured as a non-fully connected network by a network optimization that is configured to minimize and/or equalize energy consumption for the communication of all of the nodes, particularly using shortest path bridging, as well as to extent the measurement range. This may also extend the possible range for the communication between the units.

According to another embodiment of the system, at least one of the first wireless communication interfaces is configured to determine directions and/or distances to other first wireless communication interfaces by evaluation of the wireless communication, and to provide direction information about the determined directions and/or distance information about the determined distances to the evaluation device, wherein the evaluation unit is configured to derive the alignment information also based on the provided direction and/or distance information.

Determining the directions, e.g., is based on an angle-of-arrival and/or angle-of-departure evaluation of the wireless communication and/or comprises a referencing of directions to an absolute orientation reference according to a gravitational sensor. Determining the distances, e.g., is based on a distance-by-energy evaluation of the wireless communication and/or comprises using a UWB communication chip. The evaluation unit may be configured to derive relative positions of the light-receiver units from the determined directions and/or distances, wherein deriving the alignment information based on the provided direction information comprises deriving the alignment information also based on the relative positions.

According to another embodiment of the system, the evaluation device is configured to assign and provide a unique identifier to each of the light-receiver units, particularly names, numbers and/or letters, and each of the light-receiver units comprises a local display configured to display the assigned identifier. In one embodiment, the evaluation device is configured to provide the unique identifiers on the display unit linked to the alignment information. In another embodiment, the evaluation device is configured to provide information regarding an actual positional arrangement of the light-receiver units at the structure on the display unit. In a further embodiment, the evaluation device is configured to provide a user-guidance functionality for a plurality of different alignment tasks to be selected from by the user, comprising displaying on the display unit nominal positional arrangements of the light-receiver units for the plurality of different alignment tasks.

According to another embodiment, the system, comprises a light-emitter unit that is configured to emit the light plane. In particular,

- the light plane is emitted as a continuous laser fan into the direction of the light-receiver units, and the photo sensors are configured to detect an impingement position of the laser fan;
- the light-emitter unit is configured to emit a plumb-oriented light fan and/or a level-oriented light fan into the direction of the light-receiver units, so that the light plane is plumb-oriented or level-oriented;
- the system is configured in such a way that the light-receiver units receive the light of the light plane basically simultaneously;
- the light-emitter unit is configured as a hand-held light-emitter unit that is designed to be held by the user while emitting the light plane.

In one embodiment, the evaluation device is configured as or comprises the light-emitter unit (or vice versa).

According to another embodiment of the system, the evaluation device is a hand-held device, and the display is configured as a touchscreen. For instance, the evaluation device is a hand-held laser distance meter, or a hand-held light-receiver unit comprising an optical detection window, configured with a photo-detection unit to evaluate a crossing position value of an impingement of light of the light plane along the detection window.

According to another embodiment of the system, at least a subset of the light-receiver units comprise at least one of:

- a rechargeable battery and means for allowing recharging the battery, particularly comprising a USB receptacle and/or an inductive coil;
- at least one local display, particularly at least two local displays, comprising a front display and a back display;
- at least one laser distance meter for deriving a distance value from the light-receiver unit to an object, in particular wherein a direction of measurement is adjustable, and/or the distance value is displayable on the local display; and
- at least one optical indicator unit configured to indicate a deviation of the alignment of the alignment surface with respect to the light plane, particularly the crossing position value.

A second aspect relates to a light-receiver unit, particularly for use in a system according to the first aspect. The light receiver unit comprises a battery and an elongate photo sensor configured to be illuminated by a light plane and to detect an impingement position of the light plane, particularly relative to a zero position of the photo sensor, and to provide an electrical output signal indicating said impingement position. According to this aspect, the light receiver unit comprises a plurality of alignment surfaces configured to be placed at a basically flat surface of a structure to align the light-receiver device to the surface of the structure, and a wireless communication interface configured to establish a wireless communication with at least one other light-receiver device and with an evaluation device. The photo sensor and the alignment surfaces are positioned on the respective light-receiver unit in such a way that for each alignment surface a distance to the photo sensor, e.g. a distance to its zero position, is the same, and a crossing position value of the light plane can be determined based on the impingement position. The wireless communication interface is configured to transmit data indicating or providing the crossing position value to the evaluation device.

A third aspect relates to a method for deriving alignment information of a surface of a structure, particularly using the system according to the first aspect and/or the light-receiver unit according to the second aspect. The alignment information comprises a deviation of an alignment of the surface with respect to a light plane. The method comprises at least the following steps:

- detecting, basically simultaneously at a plurality of light-receiver units, an impingement position of the light plane on a photo sensor of the respective light-receiver unit,
- determining, for each light-receiver unit and based at least on the impingement position, a crossing position value of the light plane with respect to the surface,
- performing a combined analysis of the crossing position values from the plurality of light-receiver units to derive alignment information comprising the deviation of the alignment of the surface of the structure relative to the light plane, and
- displaying the alignment information to a user.

A fourth aspect relates to a computer program product comprising program code stored on a machine-readable medium, or computer-data-signal embodied as an electromagnetic wave, configured for performing, particularly when executed in an evaluation unit of an evaluation device of the system according to the first aspect, the combined analysis of the crossing position values from the plurality of light-receiver units to derive alignment information comprising the deviation of the alignment of the surface of the structure relative to the light plane as part of the method according to the third aspect.

BRIEF DESCRIPTION OF THE DRAWINGS

The invention in the following will be described in detail by referring to exemplary embodiments that are accompanied by figures, in which:

FIG. 4b shows a back side of the light-receiver unit of FIG. 4a;

DETAILED DESCRIPTION

Figure 1:
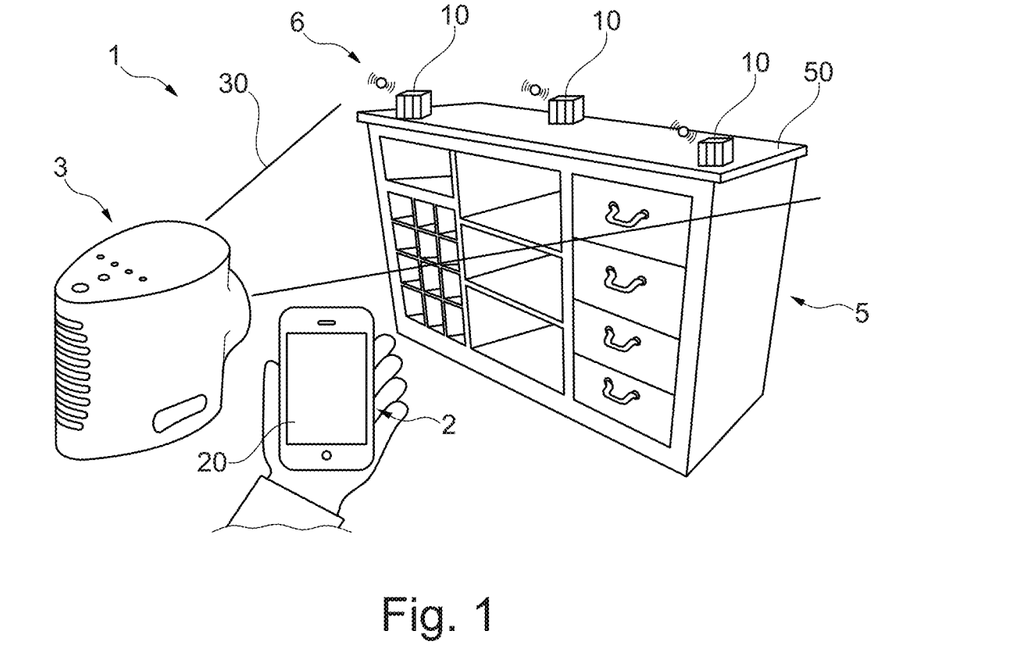
FIG. 1 shows a first exemplary embodiment of a system for determining a deviation of an alignment of a surface from a plane.

FIG. 1 depicts an exemplary embodiment of a system 1 for determining a deviation of an alignment of a surface 50 from a light plane 30. The surface 50 belongs to a structure 5, such as a piece of furniture, and in this example is a work surface on top of a cupboard. The light plane 30 is emitted in the form of a laser fan by a hand-held light-emitter unit 3. Optionally, the light-emitter unit can be configured mountable, e.g. to a tripod, a wall or ceiling. The light-emitter unit 3 may be configured to emit the light fan 30 into a direction that depends on the pose of the unit. This way the direction can be defined by the user holding or mounting the light-emitter unit 3.

Additionally or alternatively, the light-emitter unit 3 may be configured or to emit the light fan 30 in a corrected direction that does not depend on its pose, e.g. in a vertical or (as shown here) a horizontal direction. This way, a hand-held light-emitter unit can be used for defining a plane at least with respect to attitude (e.g. with role and yaw as two defined degrees of freedom). This can be used, e.g., to align a surface to a horizontal plane if the height is either already known or not important.

The system 1 further comprises three light-receiver units 10 that are positioned on the surface 50. Each of the light-receiver unit comprises a photo sensor configured to be illuminated by the light plane 30 emitted by the light-emitter unit 3 and to detect an impingement position of the light of the light plane on the photo sensor, e.g. relative to a zero position of the photo sensor. In an alternative, depending on the constraints, a setup for 2D measurement can be done with 2 sensors. An electrical output signal indicating said impingement position is then generated by the sensor and transmitted by a wireless communication signal 6, e.g. by means of Bluetooth to an evaluation device 2. Other information transmitting technologies can be used depending on the setup like optical signal transmission, including e.g. LED, IR-LED etc.

In the shown example, the light plane 30 is a continuously emitted laser fan that illuminates the photo sensors of the three light-receiver unit simultaneously. The photo sensors are configured to detect an impingement position of the continuously impinging light. The term continuously emitted laser fan shall be understood as to also include a pulsed laser fan being pulsed in the KHz region or higher (e.g. with 10 KHz or higher), i.e. appearing as a steady (and non-moving) laser fan.

For an aligned positioning of the light-receiver units 10 with the surface 50, each of the light-receiver unit comprises one or more alignment surfaces that are configured to establish a defined positional relationship between the surface 50 and the photo sensor, e.g. the zero position. The defined positional relationship may either be known or the same (or both) for each light-receiver unit.

In this exemplary embodiment, the evaluation device 2 is a smartphone, on which a computer programme application ("app") is installed that provides evaluation functionality for the data received from the light-receiver units 10 via the wireless communication 6. The evaluation device 2 is configured to analyse the received data and to derive, based thereon, alignment information regarding the alignment of the surface 50 relative to the light plane, i.e. whether they are aligned or not, and if not, how an actual orientation and position of the surface 50 deviates from the nominal orientation and position given by the light plane 30. The smartphone 2 comprises a display 20 that is embodied as a touchscreen and allows providing the alignment information to a user of the system. The user can then determine if and how a position and/or orientation of the structure 5 needs to be adjusted to align it with the light plane, i.e. in the shown example level the surface 50 so that it is horizontal.

The evaluation device may be any apparatus on which a software application (e.g. a smartphone app) is installed for performing the described functions and the using existing suitable components of this apparatus. The term "evaluation device" does not necessarily apply to a single apparatus or to an apparatus at all. Instead, the term is to be understood in such a way that the described components and/or functions of the evaluation device 2 may be divided among two or more units. Also, the term "evaluation device" may refer to the software application that is installable on generic devices and makes use of the existing suitable components to perform the described functions.

Figure 2:
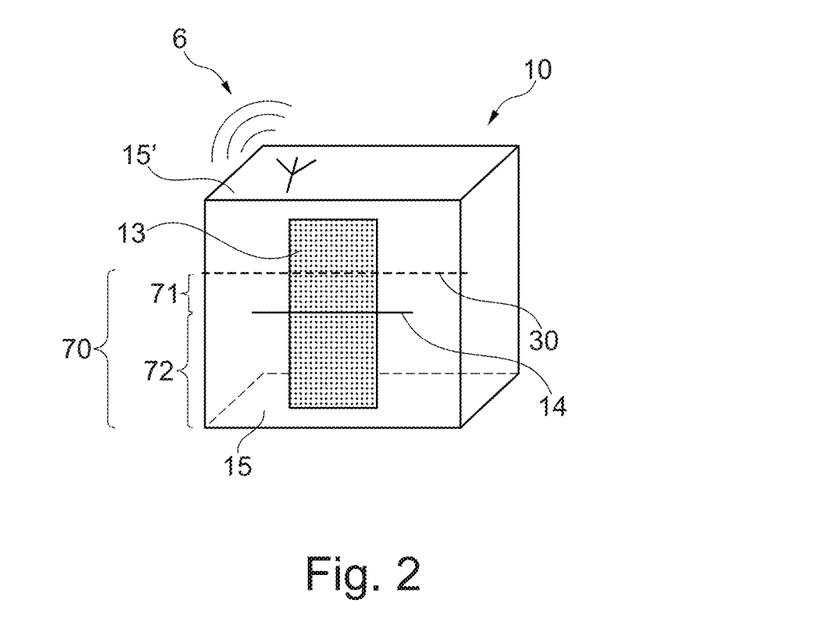
FIG. 2 shows a first exemplary embodiment of a light-receiver unit.

FIG. 2 shows a light-receiver unit 10 of the system 1 of FIG. 1. The unit comprises at least one alignment surface 15 to place the light-receiver unit 10 on a surface and align the unit with the surface. In the shown example, there are two alignment surfaces 15, 15'. The elongate photo sensor 13, which may be configured as a line sensor, has a zero position 14, for instance indicating a centre of the sensor 13. An impingement position of the light plane 30 can be detected by the photo sensor 13, for instance, as shown here, as a distance 71 from the zero position 14.

Here, a position of the photo sensor 13 relative to the alignment surface 15—and thus to a surface on which the alignment surface 15 is placed—is known. In the shown embodiment, this relative position comprises at least a distance 72 from the zero position 14 to the alignment surface 15. From the impingement position 71 and the known relative position 72, for instance by adding the two distance values, a crossing position value 70 of the light plane 30 in relation to the surface is derivable. Data indicating the crossing position value 70 for this light-receiver unit 10 is transmitted by a wireless signal 6, e.g. Bluetooth, to an evaluation device, where data from a plurality of such light-receiver units 10 is analysed. Alternatively, the analysis can be performed by an evaluation unit of the light-receiver unit 10.

In some embodiments, the crossing position value 70 is determined in the light-receiver unit 10 and the sent data include the crossing position value 70. Alternatively, the impingement position 71 and, optionally, the known relative position 72 can be sent. If the light-receiver unit 10 comprises only one alignment surface 15 and the relative position 72 to this alignment surface 15 is known to the evaluation device, only the impingement position needs to be sent. If the light-receiver unit 10 comprises more than one alignment surface 15, also an indication of which alignment surface 15 is aligned to a surface might need to be sent to the evaluation device.

If the relative position 72 is not known, an alignment of the surface can still be determined in terms of attitude, if the relative position 72 is the same in the plurality of light-receiver units 10. In this case, the impingement position 71 equals the crossing position value 70.

In preferred embodiments, the relative position between the zero position 14 and both alignment surfaces 15, 15' is the same. This way it does not matter, which of the alignment surfaces is used for aligning the light-receiver unit 10 with the surface.

For aligning with a (basically) flat surface, the alignment surfaces 15, 15' may also be flat. To prevent floating or sliding on inclined surfaces or while adjusting a tilt of a surface, the alignment surfaces 15, 15' may be rubberized or comprise magnets or similar means. Also, the overall dimensions of the light-receiver unit 10 should be chosen to prevent tipping or overturning. For instance, this can be prevented using a cubical or basically cubical shape (or similar shapes like box-shaped or a right prism (e.g. cuboid or generally right prism whose base is a regular n-sided polygon, including triangular base)) for the light-receiver unit 10 and (rectangular or square) alignment surfaces that have edge lengths of at least 2 cm each, particularly 3 cm or more.

A plurality of differently shaped or structured alignment surfaces might be used to align the unit with differently shaped or structured surfaces.

Figure 3:
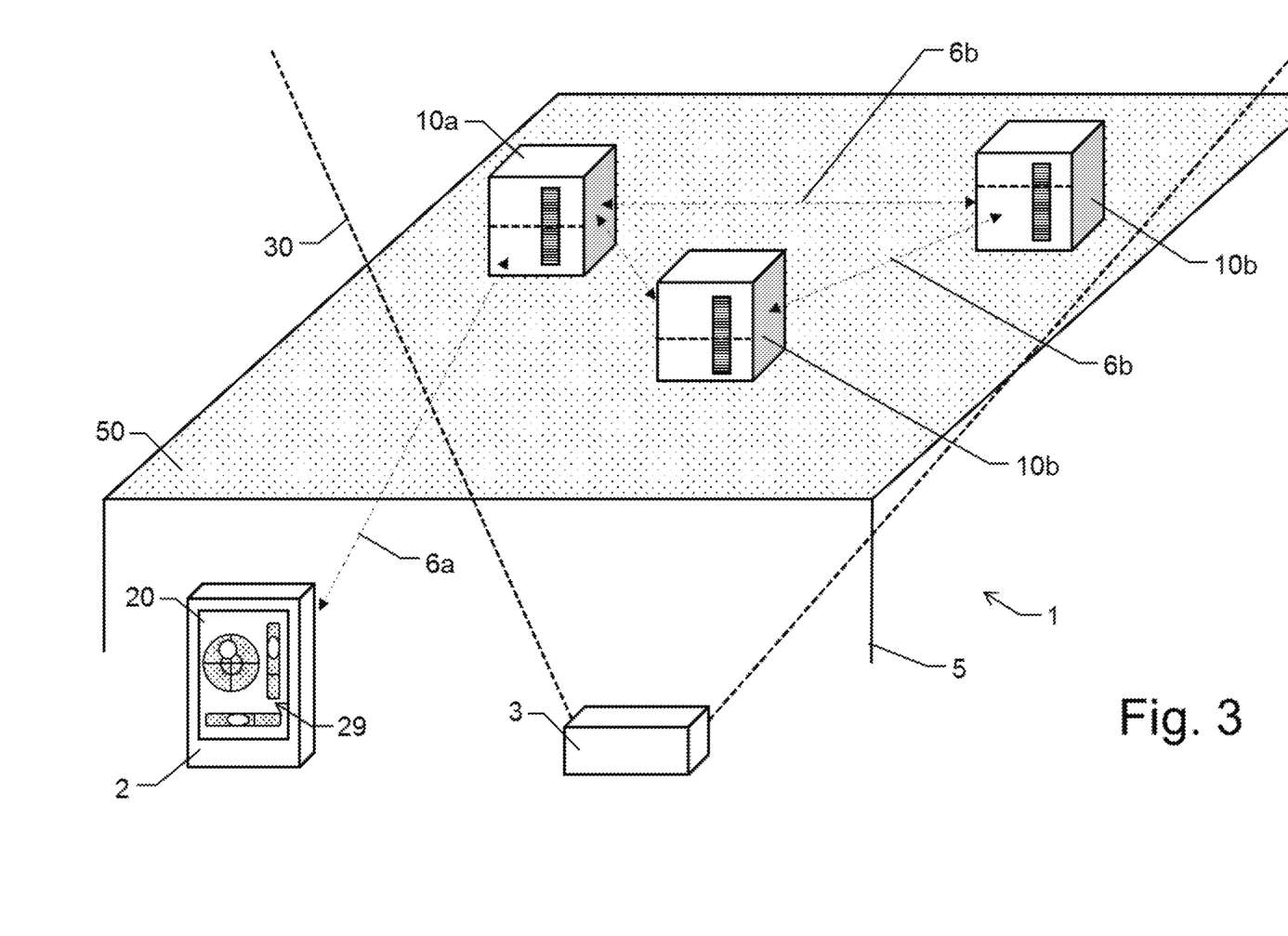
FIG. 3 shows a second exemplary embodiment of a system.

FIG. 3 shows depicts another exemplary embodiment of a system 1 for determining a deviation of an alignment of a surface 50 of a structure 5 from a light plane 30. The system 1 comprises a light emitter device 3 configured to generate the light plane 30. It can be fixedly mounted to a wall, ceiling or on a tripod to emit the same light plane 30 for a longer period of time, e.g. until the structure 5 has been positioned so that its surface 50 is aligned with the light plane 30. Alternatively or additionally, it can be configured to be held in the hand of a user while the plane 30 is emitted into the direction of the surface 50. Three (or more) light-receiver units 10a, 10b have been positioned by a user on the surface 50 to receive the light plane 30.

The user may have been assisted in positioning the light-receiver units by the hand-held evaluation device 2, which may provide on its display 20 nominal positional arrangements of the light-receiver units 10a, 10b for a plurality of different alignment tasks to be selected from by the user in a menu provided by the evaluation device 2. These alignment tasks at least comprise aligning a surface to the vertical and to the horizontal.

A first light-receiver unit can be configured as a master 10a of the group of light-receiver units, wherein the others are configured as slaves 10b. In the shown setup, this means that only the master unit 10a has the means to establish an external wireless signal 6a with the evaluation device 2. The slave units 10b are configured to communicate with the master unit 10a and optionally also with each other via the internal wireless signal 6b. Consequently, they transmit data indicating their crossing position value via the internal wireless signal 6b to the master unit 10a, which transfers the data of all units 10a, 10b to the evaluation device 2, where the data is analysed.

Alignment data of the surface 50 relative to the light plane 30 can then be displayed on the display 20, for instance comprising a virtual bubble level 29.

One or more of the light-receiver units 10a, 10b may comprise a wireless communication interface that is configured to evaluate the wireless communication 6b between the light-receiver units 10a, 10b in order to determine directions and/or distances between the light-receiver units 10a, 10b. Data about the determined directions and/or distances can then be transmitted to the evaluation device 2, where the data can be used for deriving improved alignment information for the surface 50. An evaluation unit of the evaluation device 2 may be configured to derive relative positions of the light-receiver units 10a, 10b from the determined directions and/or distances. Deriving the alignment information then may comprise deriving the alignment information also based on the relative positions.

For instance, the directions might be determined based on generally known angle-of-arrival or angle-of-departure evaluation of the wireless communication 6b. Also, determining the directions can comprise referencing directions to an absolute orientation reference according to a gravitational sensor. The distances may be determined based on a distance-by-energy evaluation of the wireless communication. Also, determining the distances may comprise using an ultra-wideband (UWB) communication chip.

Figure 4A:
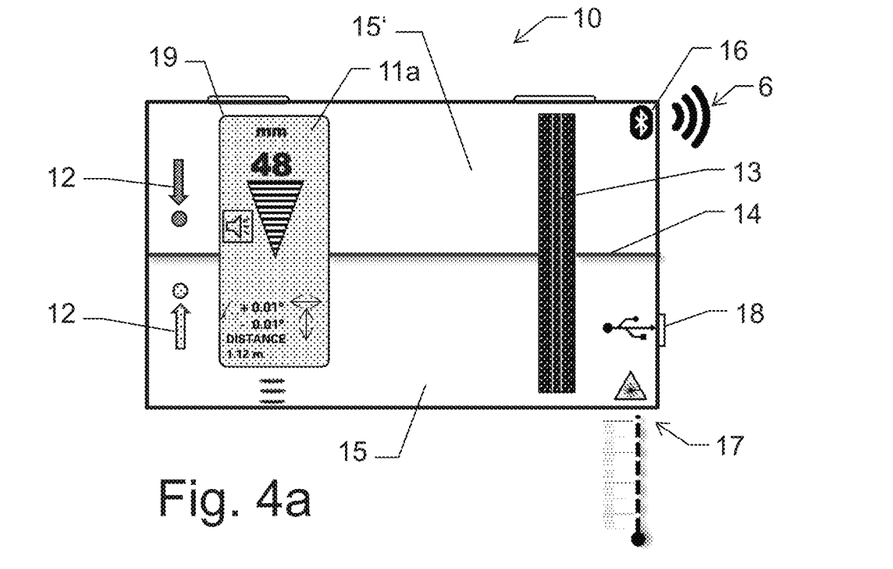
FIG. 4a shows a front side of a second exemplary embodiment of a light-receiver unit.
Figure 4B:
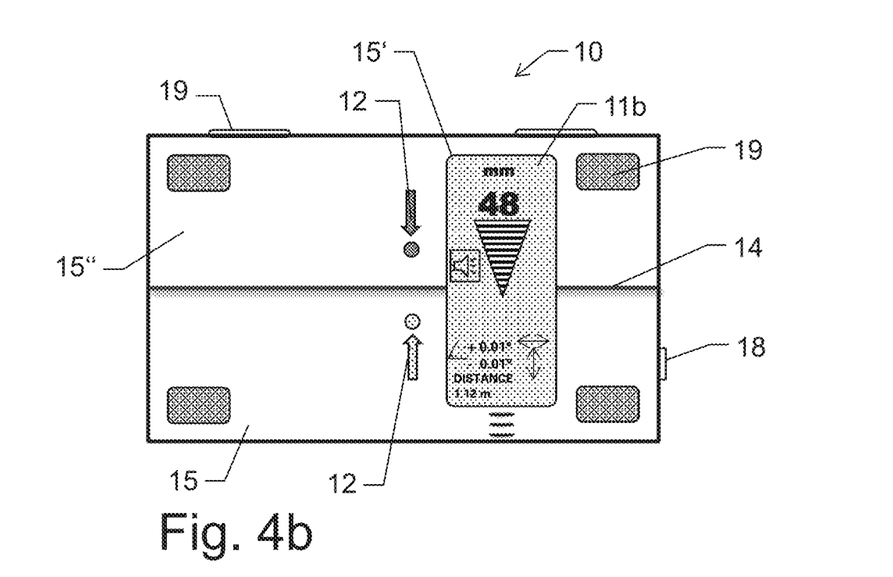

The FIGS. 4a and 4b show a front and back side of an exemplary embodiment of a light-receiver unit 10. FIG. 4a shows a front side, i.e. the side comprising the photo sensor 13. Two alignment surfaces of the unit can be seen here, a bottom alignment surface 15 and a top alignment surface 15'. An indication of the photo sensor's zero position 14 may be provided as a reference line.

The light-receiver unit 10 comprises a front display 11a for providing information regarding the unit, its relative position, measured values and/or values provided by the evaluation unit to a user. Optionally, the device may comprise a level sensor and data generated by the level sensor may be provided on the display 11a, e.g. as a digital level. Also an acoustic indicator may be provided, e.g. to indicate that a light signal of the light plane has been received by the photo sensor 13 or to provide error messages.

The light-receiver unit 10 also comprises a wireless communication unit 16, e.g. comprising a Bluetooth module and/or an ultra-wideband (UWB) module, to communicate with other light-receiver units and/or an evaluation device.

The unit preferably is battery operated, although electric energy might as well be provided by means of a cable, for instance via a USB receptacle 18. The USB receptacle 18 may also be used for charging the battery or for exchanging data with other light-receiver units or the evaluation device.

Optionally, the light-receiver unit 10 may comprise a laser distance meter 17 configured for deriving a distance value from the light-receiver unit to an object. This may be used to determine distances between the light-receiver units or between the surface and other objects, such as the surface of a structure to be aligned. The laser distance meter 17 may be provided with an adjustable measurement direction, e.g. tiltable or otherwise movable. Measured distances can be displayed on the display 11a and/or transmitted to the evaluation device.

The unit also comprises an optical indicator—either configured as a part of the display 11a or (as shown here) as an optical indicator unit 12—that is configured to indicate a deviation of the alignment of the presently used alignment surface 15, 15' with respect to the light plane. This indication may be based on the crossing position value that has been derived either in the unit or in the evaluation device and transmitted back via the wireless signal 6. If the light plane is emitted continuously, the information of the optical indicator unit 12 may be updated in real time. This informs the user how to adjust the surface at this position, thereby advantageously facilitating an adjustment of the pose of the structure—e.g. with two or three rotational degrees of freedom and two or three translational degrees of freedom (4DOF or 6DOF)—in order to align the surface with the light plane.

Some or all of the alignment surfaces 15, 15' may comprise one or more magnets 19 or other means for fixedly aligning the alignment surface 15, 15' to a surface, e.g. below a surface or to a vertical surface. Also tripod sockets (not shown here) can be provided at the alignment surfaces 15, 15'. Additionally or alternatively, only a receptacle that is configured to receive a magnet and/or a tripod socket can be integrated into the alignment surface 15, 15'.

FIG. 4*b* shows the backside of the light-receiver unit 10 of FIG. 4*a*. The backside is configured as another alignment surface 15" and comprises four magnets 19 four fixedly attaching the unit at a magnetic surface. The unit comprises a back display 11*b* that may comprise the same functionalities as the front display 11*a*. Alternatively or additionally, further displays that are not shown here can be provided on other sides of the light-receiver unit 10—especially if it is cuboidally shaped—, e.g. as a top, bottom or side display.

Also other features of the front side, like a second optical indicator unit 12 or a second photo sensor 13 may be provided on the backside of the unit. Also, other sides than the backside may comprise some or all features of the front or back side of the unit shown here.

Figure 5A:
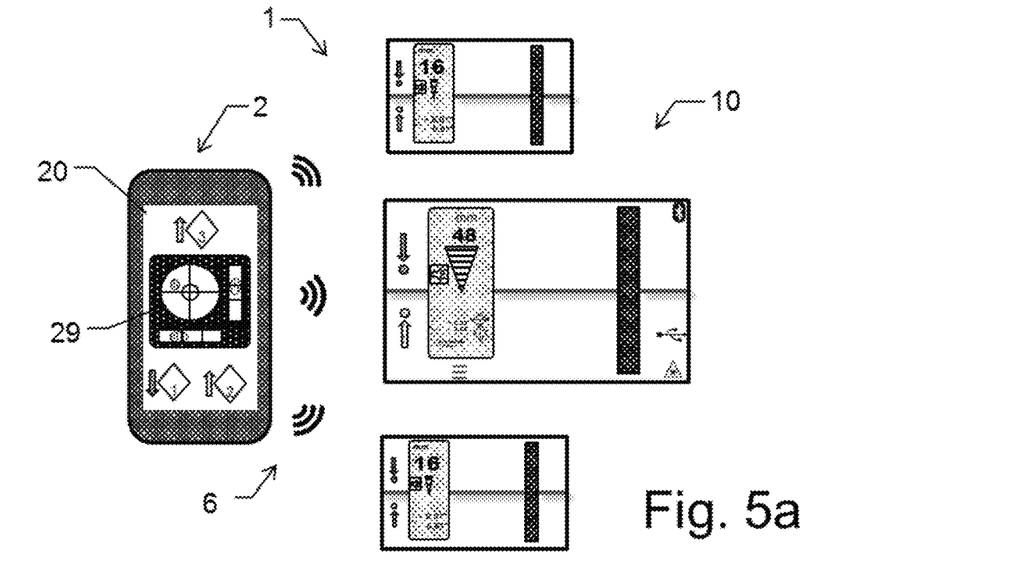
FIG. 5a shows a third exemplary embodiment of a system.
Figure 5B:
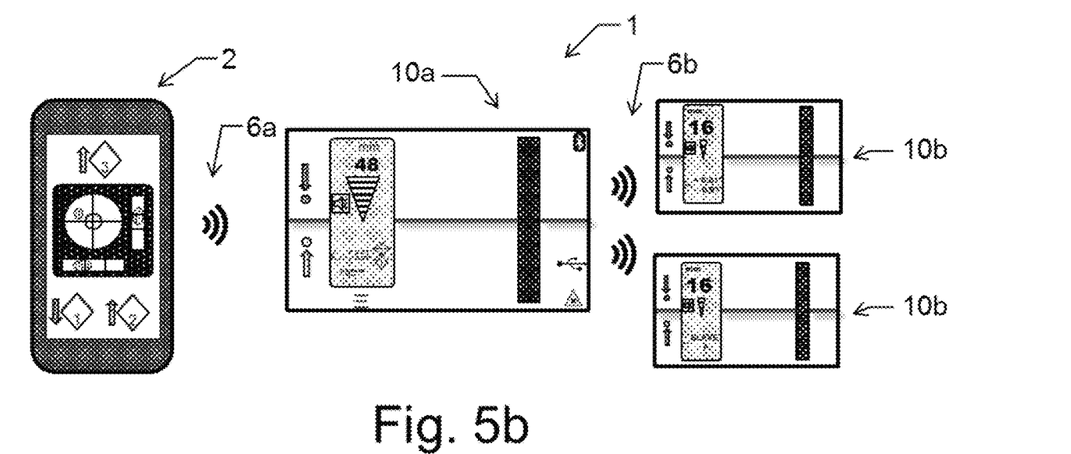
FIG. 5b shows a fourth exemplary embodiment of a system.
Figure 5C:
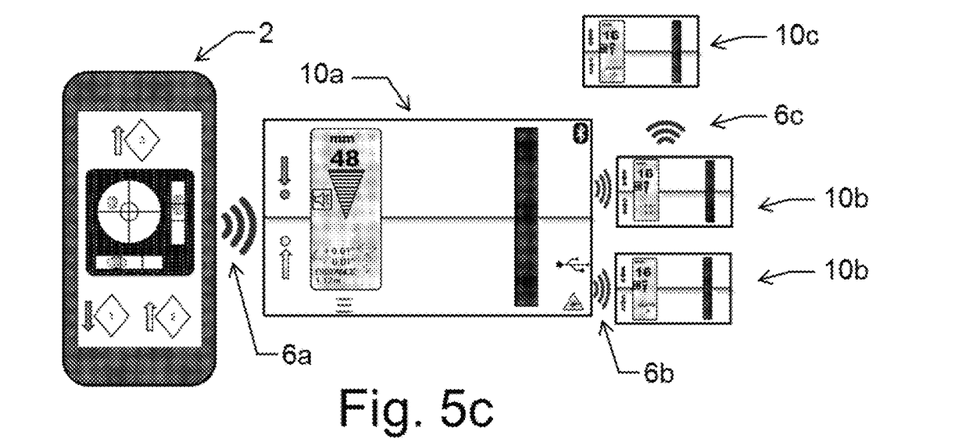
FIG. 5c shows a fifth exemplary embodiment of a system.

The FIGS. 5*a*, 5*b* and 5*c* illustrate three exemplary embodiments of the system 1. Each system comprises an evaluation device 2 with a display unit 20 on which alignment information is displayable for instance including a virtual bubble level 29.

In the system 1 of FIG. 5*a*, three light-receiver units 10 use a wireless communication signal 6 to communicate directly with the evaluation device 2.

In the system 1 of FIG. 5*b*, a first light-receiver unit 10*a* uses a first wireless communication signal 6*a* to communicate directly with the evaluation device 2. Two further light-receiver units 10*b* use a second wireless communication signal 6*b* to communicate with the first light-receiver unit 10*a*. The first light-receiver unit 10*a* serves as a master device and the further light-receiver units 10*b* serve as slave devices in the shown system 1. The slave devices 10*b* transmit their data to the master device 10*a*, which—optionally pre-evaluated—transmits the data of all light-receiver units 10*a*, 10*b* to the evaluation device 2.

The system 1 of FIG. 5*c* comprises the same master and slave setup as the system of FIG. 5*b* and additionally is configured to establish a scatternet communication network 6*c* with additional light receiver units 10*c*. The scatternet communication network 6*c* may conjured as a non-fully connected network, a mesh of piconets or meshnet. Network optimization may be used for minimizing or equalizing energy consumption for the communication between the units, for instance with a shortest path bridging.

Figure 6:
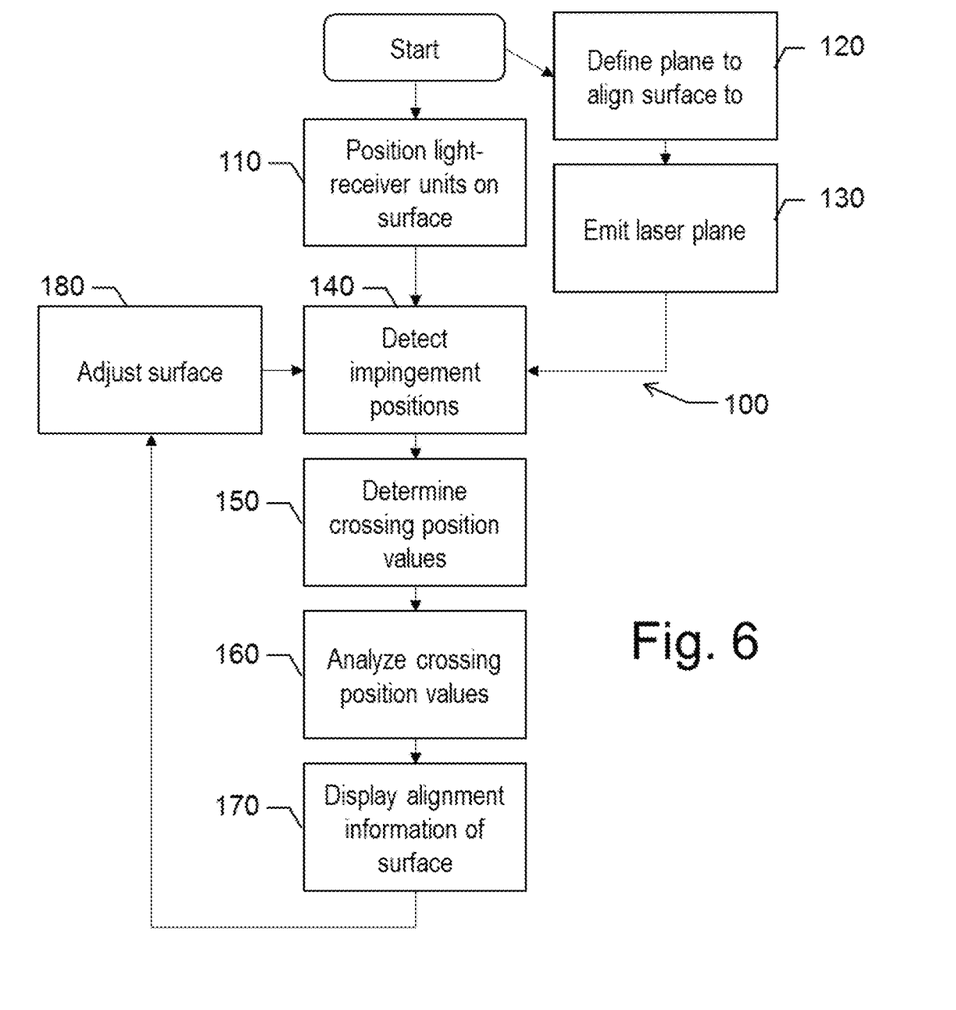
FIG. 6 shows a flow chart illustrating an exemplary embodiment of a method.

FIG. 6 shows a flowchart illustrating an exemplary embodiment of a method 100 for deriving alignment information of a surface using the system described above. Said alignment information relates to a deviation of an alignment of the surface with respect to a user-defined plane.

The illustrated method 100 starts with a user positioning 110 light-receiver units on the surface to be aligned. As described above, the light receiver units each have an alignment surface which allows aligning the units to the surface. The user defines 120 the plane to which the surface should be aligned and positions a laser-emitter device accordingly to emit 130 a light plane, e.g. a laser plane, along the user-defined plane.

Defining 120 the plane and positioning 110 the light-receiver units can be performed in arbitrary order. Emitting 130 the light plane before positioning 110 the light-receiver units may facilitate positioning and orienting the surface (or the structure to which the surface belongs) roughly at the desired position, so that illumination of the light-receiver units by the emitted light plane is ensured.

In some embodiments, the following steps 140, 150, 160 and 170 of the method can be performed without any user interaction, i.e. fully automatically by the system.

If the light-receiver units have been positioned correctly, the photo sensor of each of the light receiver units is illuminated by the light plane, so that the impingement positions of the light plane on the sensors are detected 140.

Based on the detected impingement positions and the known positions of the photo sensors relative to the alignment surfaces, crossing position values of the light plane relative to the surface can be determined 150 for each light receiver unit.

The plurality of crossing position values is analysed 160 to derive the alignment information of the surface. Said alignment information is then displayed 170 to the user to inform the user whether it is necessary to adjust 180 the surface alignment and how—e.g. by moving the structure and/or modifying the height of one or more of its stands. The method (or parts thereof) can then be repeated iteratively until the surface is perfectly aligned to the user-defined plane—or at least aligned sufficiently for the given purpose. In the shown example, the laser plane is emitted 130 continuously, so that after adjusting 180 the surface the method continues with detecting 140 the new impingement positions on the light-receiver units.

Figure 7:
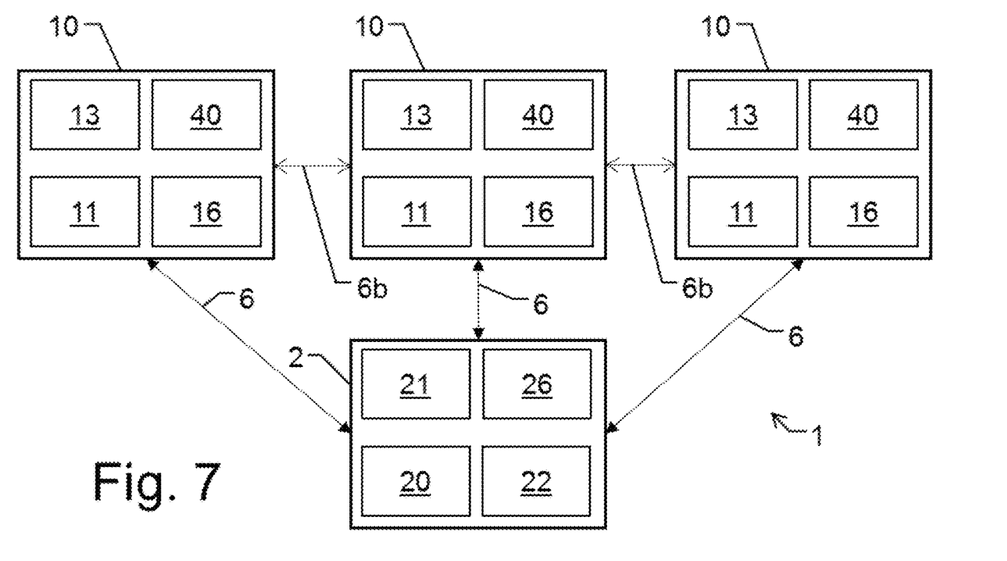
FIG. 7 shows a component distribution in a sixth exemplary embodiment of a system.
Figure 8:
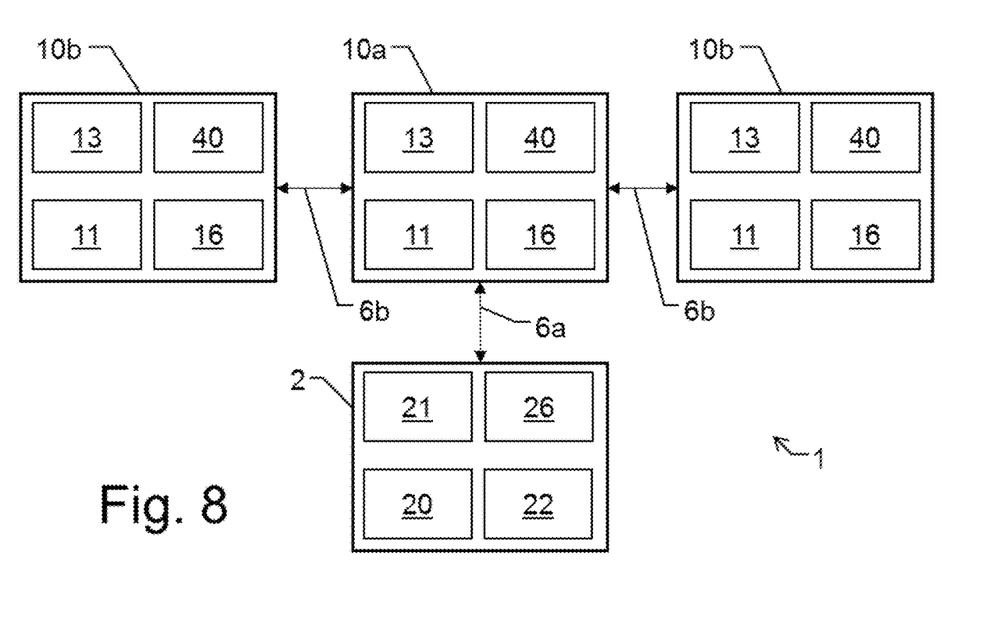
FIG. 8 shows a component distribution in a seventh exemplary embodiment of a system.
Figure 9:
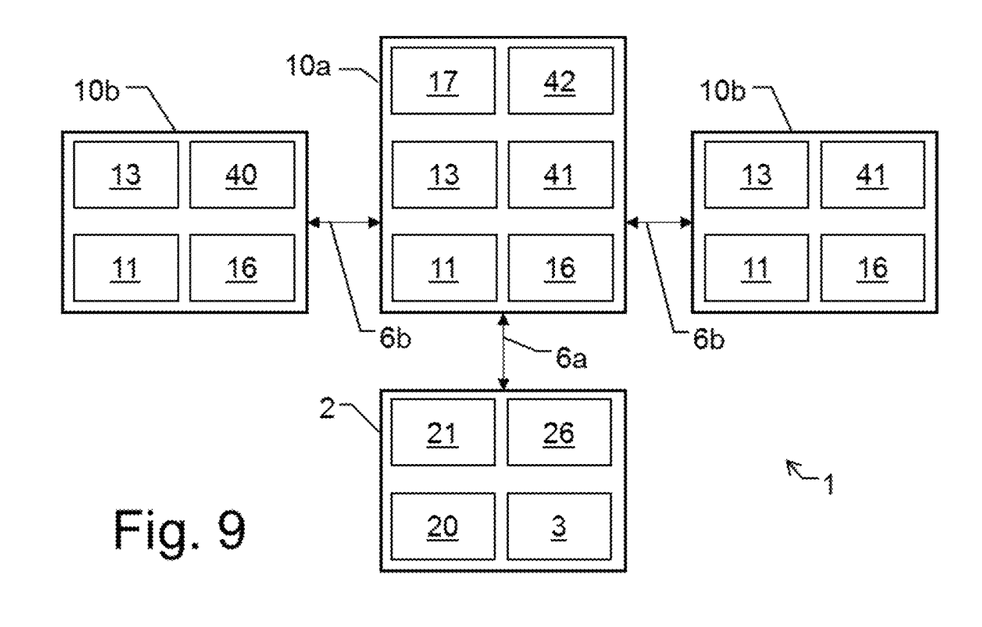
FIG. 9 shows a component distribution in an eighth exemplary embodiment of a system.

FIGS. 7, 8 and 9 each show a schematic representation of an exemplary embodiment of a system 1, showing the distribution of certain components among the devices. In each of the three embodiments, the system comprises an evaluation device and three light-receiver units.

In FIG. 7, each of the light-receiver units 10 comprises a wireless communication unit 16 that communicating directly with the evaluation unit 2 via a wireless communication signal 6. The evaluation unit 2 comprises a corresponding wireless communication unit 26. Optionally, the wireless communication units 16 of the light-receiver units 10 may also be configured to communicate with each other via wireless communication signals 6*b*.

Each of the three light-receiver units 10 further comprises a photo sensor 13, a display 11 and an orientation sensor 40.

The photo sensor 13 is configured to detect the impingement position, and the display 11 is configured to provide information regarding the respective light-receiver unit 10, its relative position, measured values and/or values provided by the evaluation unit to a user.

The orientation sensor 40 is configured to provide an electrical output signal indicating an orientation of the respective light-receiver unit 10. The orientation sensor 40 may for instance comprises an accelerometer or a level sensor and optionally a compass. The orientation sensor's electrical output signal for instance may be used to indicate which of a plurality of alignment surfaces is currently aligned to a surface. For instance, if the alignment task comprises positioning the light-receiver units 10 on top of a surface, the used alignment surface will be that on the bottom of the light-receiver unit. Since the relative position of the photo sensor might be different for each alignment surface, this information may be used for determining the crossing position value.

The evaluation device 2 comprises a display unit 20, an evaluation unit 21 and a computation unit 22.

The computation unit 22 is configured to calculate the crossing position value based on the impingement position and the relative position of the alignment surface. The data received from the light-receiver units 10 consequently provides the impingement position and the relative position of the alignment surface for each of the light-receiver units 10. The evaluation unit 21 is configured to perform a combined analysis of the crossing position values from the plurality of light-receiver units and to derive, based thereon, the alignment information for the surface to be aligned. The display unit 20 configured to display the alignment information to a user of the system 1.

In FIG. 8, the three light-receiver units comprise a first light-receiver unit 10*a* (master) and two second light-receiver units 10*b* (slaves). Only the master 10*a* communicates directly with the evaluation device 2 (external signal 6*a*), whereas the slaves 10*b* only communicate with the master 10*a* and optionally with each other (internal signals 6*b*). Otherwise, the distribution of the components is the same as in the system 1 of FIG. 7. Consequently, the slaves 10*b* send their detected impingement positions—and possibly further information necessary to calculate the crossing position value—to the master 10*a*. The master 10*a* sends all information to the evaluation device 2.

In FIG. 9, the three light-receiver units comprise a first light-receiver unit 10*a* (master) and two second light-receiver units 10*b* (slaves). In contrast to the embodiments of FIGS. 7 and 8, the first light-receiver unit 10*a* comprises a computation unit 42 that is configured to calculate the crossing position value based on the impingement position and the relative position of the alignment surface. Consequently, the slaves 10*b* provide their impingement positions to the master 10*a* which calculates in its computation unit 4 the crossing position value for each of the light-receiver units 10*a*, 10*b* and transmits the crossing position values via the external signal 6*a* to the evaluation device 2.

The data received from the light-receiver units 10 consequently provides the impingement position and the relative position of the alignment surface for each of the light-receiver units 10*a*, 10*b*. The evaluation unit 21 is configured to perform a combined analysis of the crossing position values from the plurality of light-receiver units and to derive, based thereon, the alignment information for the surface to be aligned. The display unit 20 configured to display the alignment information to a user of the system 1.

The first light-receiver unit 10*a* also comprises one or more laser distance meters 17 configured to determine a distance and direction to distant objects. The laser distance meters 17 can be used to determine positions of the slaves 10*b* relative to the master 10*a*—for instance in combination with an orientation sensor. These relative positions may be provided via the external signal 6*a* to the evaluation device 2 to be considered in determining the alignment information. Alternatively or additionally, the one or more laser distance meters 17 can be used to arrange the light-receiver units 10*a*, 10*b* on the surface according to a nominal arrangement provided as a user guidance by the evaluation device 2, e.g. on the display unit 20 of the evaluation device 2 and/or the display units 11 of the light-receiver units 10*a*, 10*b*.

Instead of an orientation sensor 40 that is configured to provide an electrical output signal indicating an orientation of the respective light-receiver unit 10*a*, 10*b*, some or all of the light-receiver units 10*a*, 10*b* may comprise a proximity sensor 41 at one or more of the alignment surfaces. These proximity sensors 41 are configured to provide an electrical output signal indicating whether the respective alignment surface is placed at a surface. The proximity sensors 41 may comprise capacitive sensors, a magnetic sensors and/or optical sensors. The computation unit 42 is then configured to determine which alignment surface of the respective light-receiver unit 10*a*, 10*b* is currently placed at the surface, using the output signal of the proximity sensor 41. Also, the crossing position value may then be calculated based on the output signal of proximity sensor 41.

The evaluation device 2 and the light-emitter unit 3 may be configured as one device, particularly as a hand-held device comprising both functions. In the shown example, the evaluation device 2 comprises the light-emitter unit 3. But of course, the light-emitter unit 3 may be configured as the evaluation device 2 and/or comprise all of its components.

Although the invention is illustrated above, partly with reference to some preferred embodiments, it must be understood that numerous modifications and combinations of different features of the embodiments can be made. All of these modifications lie within the scope of the appended claims.

What is claimed is:

1. A system for deriving alignment information of a surface of a structure, the alignment information comprising a deviation of an alignment of the surface with respect to a light plane, the system comprising a plurality of light-receiver units, each light-receiver unit comprising an elongate photo sensor configured to be illuminated by the light plane and to detect an impingement position of the light plane, particularly relative to a zero position of the photo sensor, and to provide an electrical output signal indicating said impingement position, wherein the system comprises an evaluation device configured to be in wireless communication with at least one of the light-receiver units, wherein each of the light-receiver units comprises:
at least one alignment surface configured to be placed at the surface of the structure to align the light-receiver device to the surface of the structure, and
a first wireless communication interface configured to establish a wireless communication with the evaluation device and/or with the first wireless communication interface of at least one other light-receiver device of the system;

a crossing position value of the light plane can be determined based on the impingement position for each light-receiver unit; and the evaluation device comprises:
a second wireless communication interface configured to establish a wireless communication with the first communication interfaces of at least a subset of the plurality of light-receiver units and to receive data indicating or providing the crossing position values of each of the light-receiver units,
an evaluation unit that is configured to perform a combined analysis of the crossing position values from the plurality of light-receiver units and to derive, based thereon, alignment information comprising the deviation of the alignment of the surface of the structure relative to the light plane, and
a display unit, wherein the evaluation device is configured to the provide alignment information on the display unit to a user of the system.

2. The system according to claim 1, wherein each of the light-receiver units is formed substantially cubical or cuboidal and comprises a multitude of alignment surfaces, each of the multitude of alignment surfaces being configured to be placed at the surface of the structure to align the light-receiver device to the surface of the structure, wherein:
- each of the light-receiver units comprises at least three, in particular at least five, alignment surfaces,
- the alignment surfaces are formed to be positioned on a basically flat surface,
- each alignment surface is basically rectangular, and/or
- each alignment surface has a width and a length of at least 2 cm each.

3. The system according to claim 1, wherein:
the crossing position value relates to a crossing position of the light plane with respect to the alignment surface, particularly wherein the crossing position value includes a distance value;
for each of the light-receiver units a position of the alignment surface relative to the photo sensor is known, particularly at least a distance to its zero position; and
the system comprises at least one computation unit configured to calculate the crossing position value based on the impingement position and the relative position of the alignment surface,
the evaluation device comprises the computation unit, and the received data provides the impingement position and the relative position of the alignment surface for each of the light-receiver units; or
each of the light-receiver units comprises a computation unit configured to calculate the crossing position of the respective light-receiver unit, wherein data providing the crossing positions is transmitted to the evaluation device; or
a first light-receiver unit of the light-receiver units comprises the computation unit, wherein data providing the impingement position and the relative position of the alignment surface is transmitted from the other light-receiver units to the first light-receiver unit, and data providing the crossing positions is transmitted from the first light-receiver unit to the evaluation device.

4. The system according to claim 3, wherein each of the light-receiver units comprises a plurality of alignment surfaces, wherein each of the light-receiver units comprises:
- an orientation sensor that is configured to provide an electrical output signal indicating an orientation of the respective light-receiver unit; and/or
- a proximity sensor at one or more of the alignment surfaces, configured to provide an electrical output signal indicating whether the respective alignment surface is placed at a surface, particularly at the surface of the structure,
wherein the computation unit is configured:
- to determine, based on the output signal of the orientation sensor and/or the proximity sensor, which alignment surface of the plurality of alignment surfaces is placed at the surface of the structure, and/or
- to calculate the crossing position value based on the output signal of the orientation sensor and/or the proximity sensor,
wherein the orientation sensor comprises at least one of an accelerometer, a level sensor and a compass;
the proximity sensor comprises at least one of a capacitive sensor, a magnetic sensor and an optical sensor; and/or
at least one of the alignment surfaces comprises at least one of a magnet, a tripod socket and a receptacle to receive a magnet and/or a tripod socket.

5. The system according to claim 1, wherein:
the light plane is a continuously emitted laser fan and the photo sensor is configured to detect an impingement position of the continuously emitted laser fan; and/or
each of the light-receiver units comprises at least two alignment surfaces, wherein the photo sensor and the alignment surfaces are positioned on the respective light-receiver unit in such a way that for each alignment surface a distance to the photo sensor, particularly a distance to its zero position, is the same.

6. The system according to claim 1, comprising at least three light-receiver units, wherein the evaluation unit is configured:
- to perform a combined analysis of the crossing position values from the at least three light-receiver units and
- to derive, based on the analysis, alignment information comprising the deviation of the alignment of the surface of the structure relative to the light plane in two or three dimensions, particularly with at least four degrees of freedom.

7. The system according to claim 1, comprising at least three light-receiver units, wherein the first wireless communication interfaces are configured to establish the wireless communication via Bluetooth and to establish a scatternet communication network, in particular configured as a non-fully connected network by a network optimization that is configured to minimize and/or equalize energy consumption for the communication of all of the nodes, particularly using shortest path bridging, and/or to extent the measurement range.

8. The system according to claim 1, wherein at least one of the first wireless communication interfaces is configured:
- to determine directions and/or distances to other first wireless communication interfaces by evaluation of the wireless communication, and
- to provide direction information about the determined directions and/or distance information about the determined distances to the evaluation device; and
- the evaluation unit is configured to derive the alignment information also based on the provided direction and/or distance information,
wherein:
determining directions is based on an angle-of-arrival and/or angle-of-departure evaluation of the wireless communication and/or comprises a referencing of directions to an absolute orientation reference according to a gravitational sensor; and/or
determining distances is based on a distance-by-energy evaluation of the wireless communication and/or comprises using a UWB communication chip; and/or
the evaluation unit is configured to derive relative positions of the light-receiver units from the determined directions and/or distances, wherein deriving the alignment information based on the provided direction information comprises deriving the alignment information also based on the relative positions.

9. The system according to claim 1, wherein the evaluation device is configured:
- to assign and provide a unique identifier to each of the light-receiver units, particularly wherein the identifiers comprise names, numbers and/or letters, and each of the light-receiver units comprises a local display configured to display the assigned identifier, particularly wherein the evaluation device is configured to provide the unique identifiers on the display unit linked to the alignment information; and/or to provide information regarding an actual positional arrangement of the light-receiver units at the structure on the display unit; and/or to provide a user-guidance functionality for a plurality of different alignment tasks to be selected from by the user, comprising displaying on the display unit nominal positional arrangements of the light-receiver units for the plurality of different alignment tasks.

10. The system according to claim 1, comprising a light-emitter unit that is configured to emit the light plane.

11. The system according to claim 10, wherein:

the light plane is emitted as a continuous laser fan into the direction of the light-receiver units, and the photo sensors are configured to detect an impingement position of the laser fan;

the light-emitter unit is configured to emit a plumb-oriented light fan and/or a level-oriented light fan into the direction of the light-receiver units, so that the light plane is plumb-oriented or level-oriented;

the system is configured in such a way that the light-receiver units receive the light of the light plane basically simultaneously;

the light-emitter unit is configured as a hand-held light-emitter unit that is designed to be held by the user while emitting the light plane; and/or the evaluation device is configured as or comprises the light-emitter unit.

12. The system according to claim 1, wherein the evaluation device is a hand-held device, and the display is configured as a touchscreen, particularly wherein the evaluation device is:

a hand-held laser distance meter, or a hand-held light-receiver unit comprising an optical detection window, configured with a photo-detection unit to evaluate a crossing position value of an impingement of light of the light plane along the detection window.

13. The system according to claim 1, wherein at least a subset of the light-receiver units comprise at least one of:

a rechargeable battery and means for allowing recharging the battery, particularly comprising a USB receptacle and/or an inductive coil;

at least one local display, particularly at least two local displays, comprising a front display and a back display;

at least one laser distance meter for deriving a distance value from the light-receiver unit to an object, in particular wherein a direction of measurement is adjustable, and/or the distance value is displayable on the local display;

at least one optical indicator unit configured to indicate a deviation of the alignment of the alignment surface with respect to the light plane, particularly the crossing position value.

14. A light receiver unit, for use in a system according to claim 1, the light receiver unit comprising a battery and an elongate photo sensor configured to be illuminated by a light plane and to detect an impingement position of the light plane, particularly relative to a zero position of the photo sensor, and to provide an electrical output signal indicating said impingement position, wherein:

a plurality of alignment surfaces configured to be placed at a basically flat surface of a structure to align the light-receiver device to the surface of the structure, and a wireless communication interface configured to establish a wireless communication with at least one other light-receiver device and with an evaluation device, wherein the photo sensor and the alignment surfaces are positioned on the respective light-receiver unit in such a way that for each alignment surface a distance to the photo sensor, particularly a distance to its zero position, is the same, a crossing position value of the light plane can be determined based on the impingement position, and the wireless communication interface is configured to transmit data indicating or providing the crossing position value to the evaluation device.

15. A method for deriving alignment information of a surface of a structure, the alignment information comprising a deviation of an alignment of the surface with respect to a light plane, the method comprising:

detecting, basically simultaneously at a plurality of light-receiver units, an impingement position of the light plane on a photo sensor of the respective light-receiver unit, determining, for each light-receiver unit and based at least on the impingement position, a crossing position value of the light plane with respect to the surface, performing a combined analysis of the crossing position values from the plurality of light-receiver units to derive alignment information comprising the deviation of the alignment of the surface of the structure relative to the light plane, and displaying the alignment information to a user.

16. A computer program product comprising program code stored on a machine-readable medium, or computer-data-signal embodied as an electromagnetic wave, configured for performing, when executed in the evaluation unit of the evaluation device of the system according to claim 1, a combined analysis of the crossing position values from the plurality of light-receiver units to derive alignment information comprising the deviation of the alignment of the surface of the structure relative to the light plane.

17. A computer program product comprising program code stored on a machine-readable medium, or computer-data-signal embodied as an electromagnetic wave, configured for performing, when executed in an evaluation unit of an evaluation device, a combined analysis of the crossing position values from a plurality of light-receiver units to derive alignment information comprising a deviation of the alignment of the surface of a structure relative to a light plane as part of the method according to claim 14.

18. The system according to claim 4, wherein:

the light plane is a continuously emitted laser fan and the photo sensor is configured to detect an impingement position of the continuously emitted laser fan; and/or each of the light-receiver units comprises at least two alignment surfaces, wherein the photo sensor and the alignment surfaces are positioned on the respective light-receiver unit in such a way that for each alignment surface a distance to the photo sensor, particularly a distance to its zero position, is the same.

19. The system according to claim 6, comprising at least three light-receiver units, wherein the first wireless communication interfaces are configured to establish the wireless communication via Bluetooth and to establish a scatternet communication network, in particular configured as a non-fully connected network by a network optimization that is configured to minimize and/or equalize energy consumption for the communication of all of the nodes, particularly using shortest path bridging, and/or to extent the measurement range.

20. The system according to claim 11, wherein at least a subset of the light-receiver units comprises at least one of:

a rechargeable battery and means for allowing recharging the battery, particularly comprising a USB receptacle and/or an inductive coil;

at least one local display, particularly at least two local displays, comprising a front display and a back display;

at least one laser distance meter for deriving a distance value from the light-receiver unit to an object, in particular wherein a direction of measurement is adjustable, and/or the distance value is displayable on the local display;

at least one optical indicator unit configured to indicate a deviation of the alignment of the alignment surface with respect to the light plane, particularly the crossing position value.

\* \* \* \* \*